Aug. 29, 1939.  F. M. HEATH  2,171,447
GUIDE FOR FLUSH TANK VALVES
Filed April 27, 1938   2 Sheets-Sheet 1
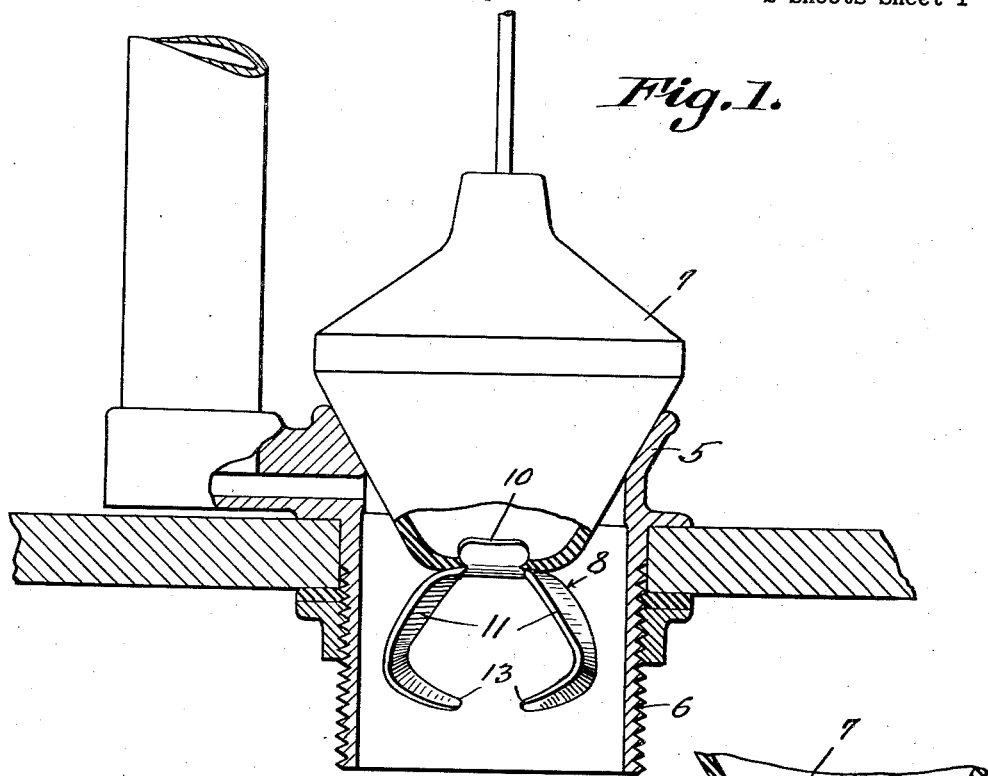
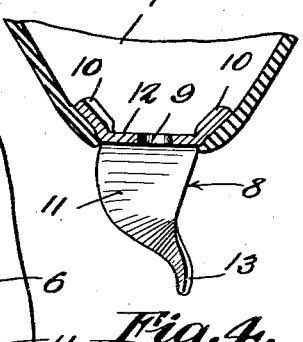
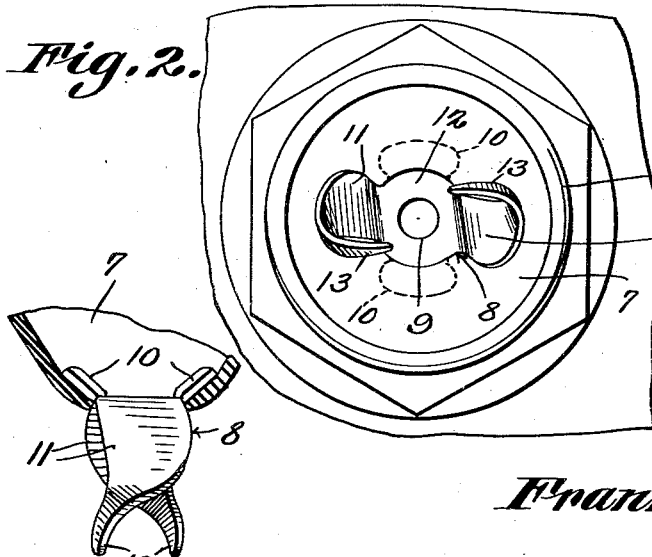
Frank M. Heath
INVENTOR.
BY CA Snow & Co
ATTORNEYS.

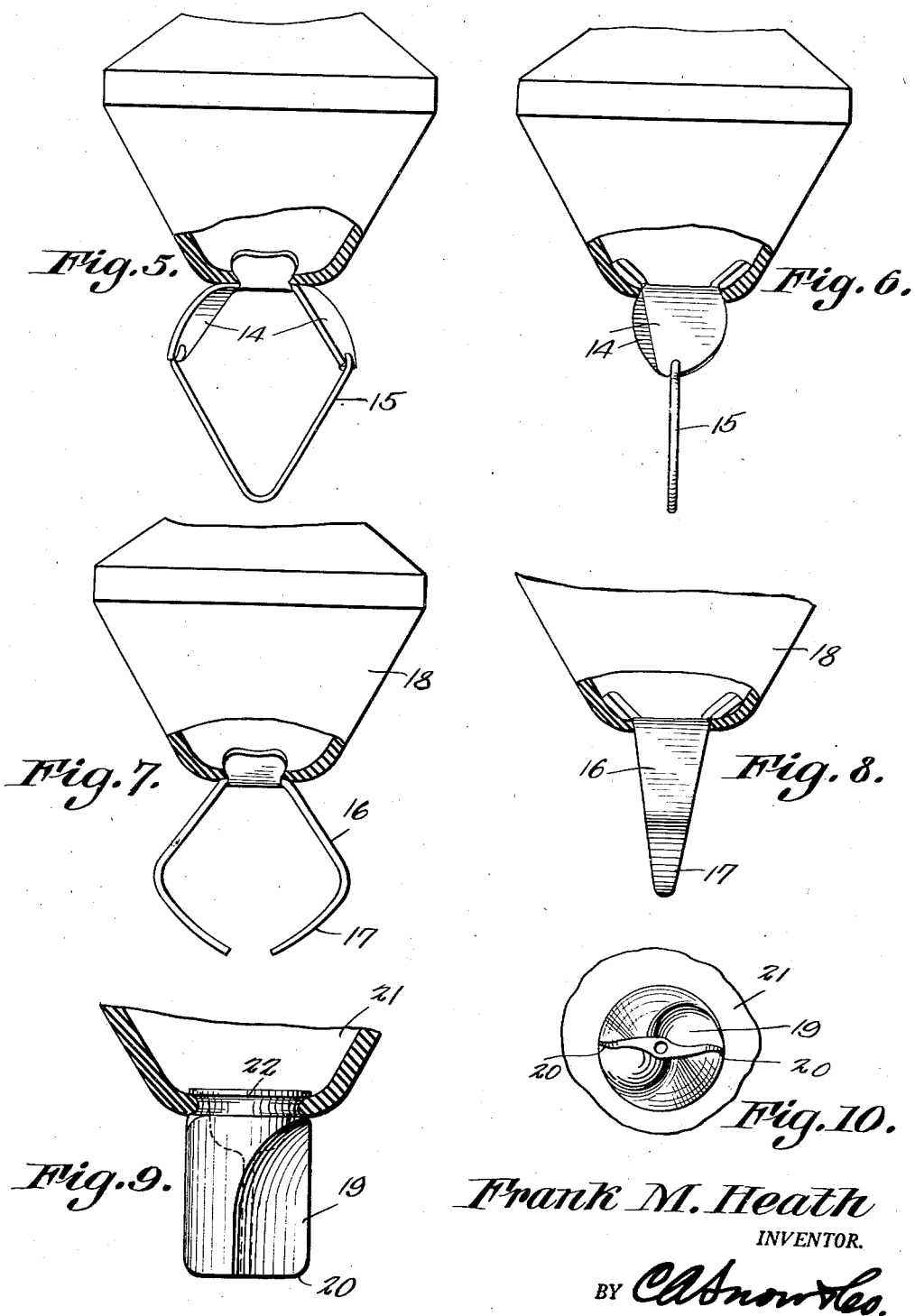

Patented Aug. 29, 1939

2,171,447

UNITED STATES PATENT OFFICE 2,171,447

GUIDE FOR FLUSH TANK VALVES

Frank M. Heath, Silver Spring, Md.

Application April 27, 1938, Serial No. 204,675

4 Claims. (Cl. 4—56)

This invention relates to an attachment for use in connection with flush tank ball valves, and is designed to guide ball valves to their seat, insuring an accurate seating of the ball valve under abnormal conditions, and is particularly efficient in seating ball valves when the usual brackets and fittings become worn to a degree to permit the ball valve to wobble or move laterally under the action of the water, as the ball valve is seating.

An important object of the invention is to provide a device of this character for use in connection with flush valve attachments embodied in my Patent No. 1,997,728, granted April 16, 1935, and which when mounted will contact with the valve seat and guide the valve to its seat to stop the flow of water from the flush tank.

A still further object of the invention is the provision of an attachment of this character to be used in connection with various types of ball valves.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a vertical sectional view through a valve seat, illustrating a ball valve equipped with a guide, as positioned on the seat.

Figure 2 is a bottom plan view of the guide as forming a part of the attachment designed to rotate the ball valve as it is seating.

Figure 3 is a fragmental side elevational view of the attachment.

Figure 4 is a sectional view through the attachment.

Figure 5 is an elevational view of an attachment to rotate a ball valve, the attachment being supplied with a modified form of guide.

Figure 6 is a side elevational view of the attachment and guide.

Figuure 7 is a further modified form of attachment and guide, forming a part thereof.

Figure 8 is a side elevational view of the attachment as shown by Figure 7.

Figure 9 is an elevational view of a still further form of rotating attachment, the free ends of the attachment being rounded to engage the valve seat and cause the valve to be guided to its seat.

Figure 10 is an end elevational view of the attachment as shown by Figure 9 of the drawings.

Referring to the drawings in detail, the reference character 5 designates the usual valve seat at the upper end of the discharge pipe 6.

In this form of the invention, the ball valve is indicated by the reference character 7 and is of the usual and well known construction, the ball valve being provided with the usual opening at its lower end.

The reference character 8 designates a rotor which is provided with an opening 9, and laterally extended arms 10 adapted to fit within the opening of the ball valve 7, as clearly shown by the drawings.

The reference character 11 designates oppositely disposed blades that project outwardly from the upper edge of the supporting section 12 of the rotor, the blades 11 being inclined longitudinally away from the valve 7, providing blades pitched in such a way that as the water strikes the blades, the ball valve will be rotated to insure its proper seating.

As clearly shown by the drawings, the lower ends of the blades 11 are tapered and extended inwardly towards each other, as at 13, presenting outer curved surfaces adapted to engage the valve seat 5 and guide the ball valve inwardly to its proper seating position.

In the form of the invention as shown by Figure 5 of the drawings, the blades 14 which are curved in substantially the same manner as the blades 8 in Figure 1 of the drawings, are formed with openings near the free ends thereof, the openings being designed to receive the upper ends of the substantially V-shaped wire 15, which extend through the openings from the outer sides of the blades, the inner ends of the wire being pressed into engagement with the blades to securely grip the blades. In order to insure against pivotal movement of the V-shaped member 15 with respect to the blades 14, recesses are formed in the outer surfaces of the blades 14 at points beyond the openings, the recesses being of widths to accommodate the V-shaped wire 15 when the ends thereof have been pressed into engagement with the blades.

As shown by Figure 7 of the drawings, the blades which are indicated at 16, have their ends tapered and bent inwardly at oblique angles with respect to the vertical, providing camming surfaces 17 to strike the valve seat and guide the ball valve, which in the present showing is indicated at 18, to its seat.

A still further modified form of the invention is indicated by Figure 9 of the drawings, and in this form of the invention, the blades which are indicated by the reference character 19 are cut from a solid piece of metal to provide curved surfaces or blades. The lower outer edges indicated at 20, are rounded to strike the valve seat, and guide the ball valve, which in this form of the invention is indicated at 21.

A head 22 is provided at one end of the body portion of this type of blade, and the head is formed with a groove to accommodate the edge of the ball valve, adjacent to the usual central opening of the ball valve, thereby firmly securing the device in position.

From the foregoing it will be seen that due to the construction shown and described, the ball valve, equipped with a guiding device constructed in accordance with the invention, will be guided to its seat at all times, regardless of the lateral movement or wobbling motion imparted to the ball valve, by the water passing through the flush tank, in which the ball valve operates.

It will further be seen that due to this construction, a guide may be readily and easily placed in the usual ball valve, without the necessity of making alterations in the ball valve structure, to mount the guide.

I claim:

1. A rotor for the ball valves of flush tanks, comprising a body portion adapted to be positioned on a ball valve, blades extending from the body portion, guides carried by the blades and extending below the body portion, and said guides adapted to engage the valve seat of the flush tank with which the ball valve is associated, as the valve descends, and guide the ball valve to its seat.

2. A rotor for the ball valves of flush tanks, comprising a body portion adapted to be secured to a ball valve, blades extending from the body portion, and guiding members carried by the blades and being curved inwardly providing curved outer surfaces adapted to engage the ball valve seat, guiding the ball valve to its seat.

3. A rotor for the ball valves of flush tanks, comprising a body portion adapted to be secured to a ball valve, blades extending from the body portion, said blades extending laterally at oblique angles, the free ends of the blades presenting curved surfaces adapted to engage the usual ball valve seat and guide the ball valve to its seat.

4. An attachment for flush tank ball valves, comprising a body portion adapted to be secured to a ball valve, blades extending outwardly from the body portion, said blades having openings formed near the free ends thereof, a substantially V-shaped wire member having its ends extending into the openings and bent into engagement with the blades, and said blades having recesses adjacent to the openings in which the wire member engages, holding the wire member against lateral movement with respect to the blades.

FRANK M. HEATH.